(No Model.)
H. L. KINGSLEY.
POLE AND NECK YOKE CONNECTION FOR VEHICLES.
No. 523,148. Patented July 17, 1894.
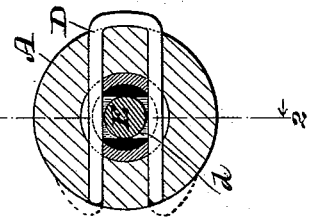
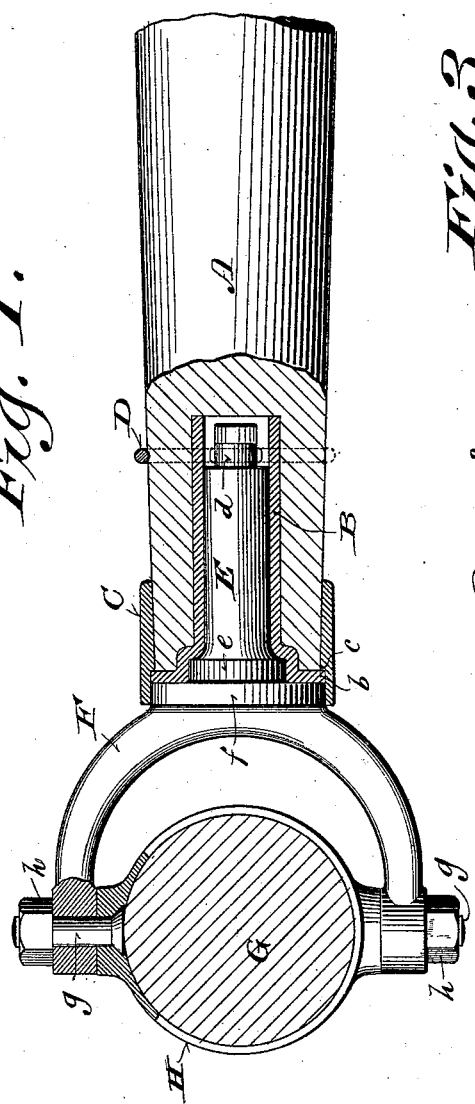
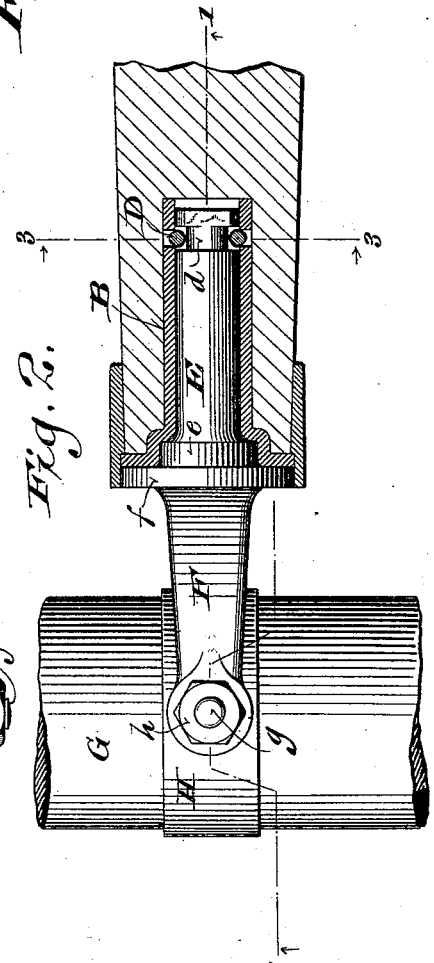
Witnesses
Geo. W. Young.
N. E. Oliphant.
Inventor:
Horace L. Kingsley
By H. G. Underwood
Attorney
THE NORRIS PETERS CO., PHOTO-LITHO., WASHINGTON, D. C.

UNITED STATES PATENT OFFICE.

HORACE L. KINGSLEY, OF RACINE, WISCONSIN.

POLE AND NECK-YOKE CONNECTION FOR VEHICLES.

SPECIFICATION forming part of Letters Patent No. 523,148, dated July 17, 1894.

Application filed March 26, 1894. Serial No. 505,108. (No model.)

*To all whom it may concern:*

Be it known that I, HORACE L. KINGSLEY, a citizen of the United States, and a resident of Racine, in the county of Racine, and in the State of Wisconsin, have invented certain new and useful Improvements in Pole and Neck-Yoke Connections; and I do hereby declare that the following is a full, clear, and exact description thereof.

My invention has for its object to cheapen the construction and increase the durability of pole and neck-yoke connections, as well as to prevent accidental disengagement of a pole and neck-yoke, and it consists in certain peculiarities of construction and combination of parts hereinafter set forth with reference to the accompanying drawings and subsequently claimed.

In the drawings: Figure 1 represents the construction and relative arrangement of parts embodied in my invention, certain of said parts being in section on line 1—1 of the succeeding figure; Fig. 2, a plan view partly in section on line 2—2 of the third figure, and Fig. 3, a transverse section on line 3—3 of the preceding figure.

Referring by letter to the drawings A represents the forward portion of a wooden vehicle pole bored longitudinally for the reception of a metallic sleeve B counter-sunk at its forward end and provided with a flange $b$ that faces the adjacent extremity of the pole and preferably seats against a shoulder $c$ in a ferrule C on said pole. Projecting into the sleeve B adjacent to its rear end is a stop of any suitable form that may be found most convenient, but as herein shown I prefer to employ a staple like device D that enters suitable openings made in the pole to engage side recesses in said sleeve. While I prefer a stop of some form the same is not absolutely essential to a pole and neck-yoke connection within the scope of my invention. When a staple is employed as a stop its ends may terminate flush with the pole, as shown by full lines, or be clinched against the same as shown by dotted lines, the former disposition of said staple permitting of its ready withdrawal far enough to clear an annular groove $d$ in the shank E of a fork F that connects with a neck-yoke G, this connection being hereinafter more particularly set forth.

The shank E loosely engages the sleeve B and is herein shown as having a portion thereof in rear of the groove $d$ cut away to obtain clearance for the stop in said sleeve, especially when this stop is permanent in its working position, and such being the case it requires that the neck-yoke be turned to a sufficient angle from the normal or horizontal position thereof when the engagement of said shank with the sleeve is effected, after which said neck-yoke is brought back to normal position to cause a locking engagement of said stop and shank-groove. It also follows that when the projection in the sleeve is permanent, the neck-yoke must be turned to the proper angle away from normal position to permit withdrawal of the shank E from said sleeve.

In the proportions herein shown, it requires a quarter-turn of the neck-yoke from a horizontal line to bring the shank E in position to clear the stop in the sleeve B, but this turning of the yoke may be obviated by the employment of a stop that may be retracted as above explained.

The shank E is preferably made with two shoulders $e, f$ the first of which fills the counter-sink in the sleeve B, while the other fills a space formed by so much of the ferrule C as may project beyond the outer flanged end of said sleeve.

The extremities of the fork F are connected to a clip or ring H on the neck-yoke G by means of bolts $g$ or other suitable pivot devices, it being preferable, as herein shown, to employ a ring having diametrical bosses in which the heads of the pivot devices are counter-sunk, and if these pivotal devices be bolts, I utilize nuts $h$ to hold the fork-extremities in place thereon.

Having now described my invention, what I claim as new, and desire to secure by Letters Patent, is—

1. The combination of a vehicle-pole having its front portion bored longitudinally, a sleeve fitting the bore, a stop projecting into the sleeve, a fork having a shank detachably engaging the stop, and a neck-yoke connected to the fork, substantially as set forth.

2. The combination of a vehicle-pole having its front portion bored longitudinally, a ferrule on the pole projecting outward therefrom, a counter-sunk sleeve fitting the bore and provided with a flange facing the pole, a fork having a shank that detachably engages the sleeve and is shouldered to fill the counter-sink of the same and projecting portion of the ferrule, and a neck-yoke connected to the fork, substantially as set forth.

3. The combination of a vehicle pole having a longitudinal socket in its outer portion, a staple inserted in the pole to project into the socket transverse of the latter, a fork having a shank provided with an annular groove and partly cut-away in rear of this groove to give clearance for the staple, and a neck-yoke connected to the fork, substantially as set forth.

4. As a merchantable commodity, a coupling comprising a suitable sleeve for insertion in the forward end of a vehicle-pole, a fork having a shank for locking engagement with the sleeve, and a neck-yoke iron pivotally connected to the fork, substantially as set forth.

In testimony that I claim the foregoing I have hereunto set my hand, at Milwaukee, in the county of Milwaukee and State of Wisconsin, in the presence of two witnesses.

HORACE L. KINGSLEY.

Witnesses:
N. E. OLIPHANT,
HENRY DANKERT.